UNITED STATES PATENT OFFICE.

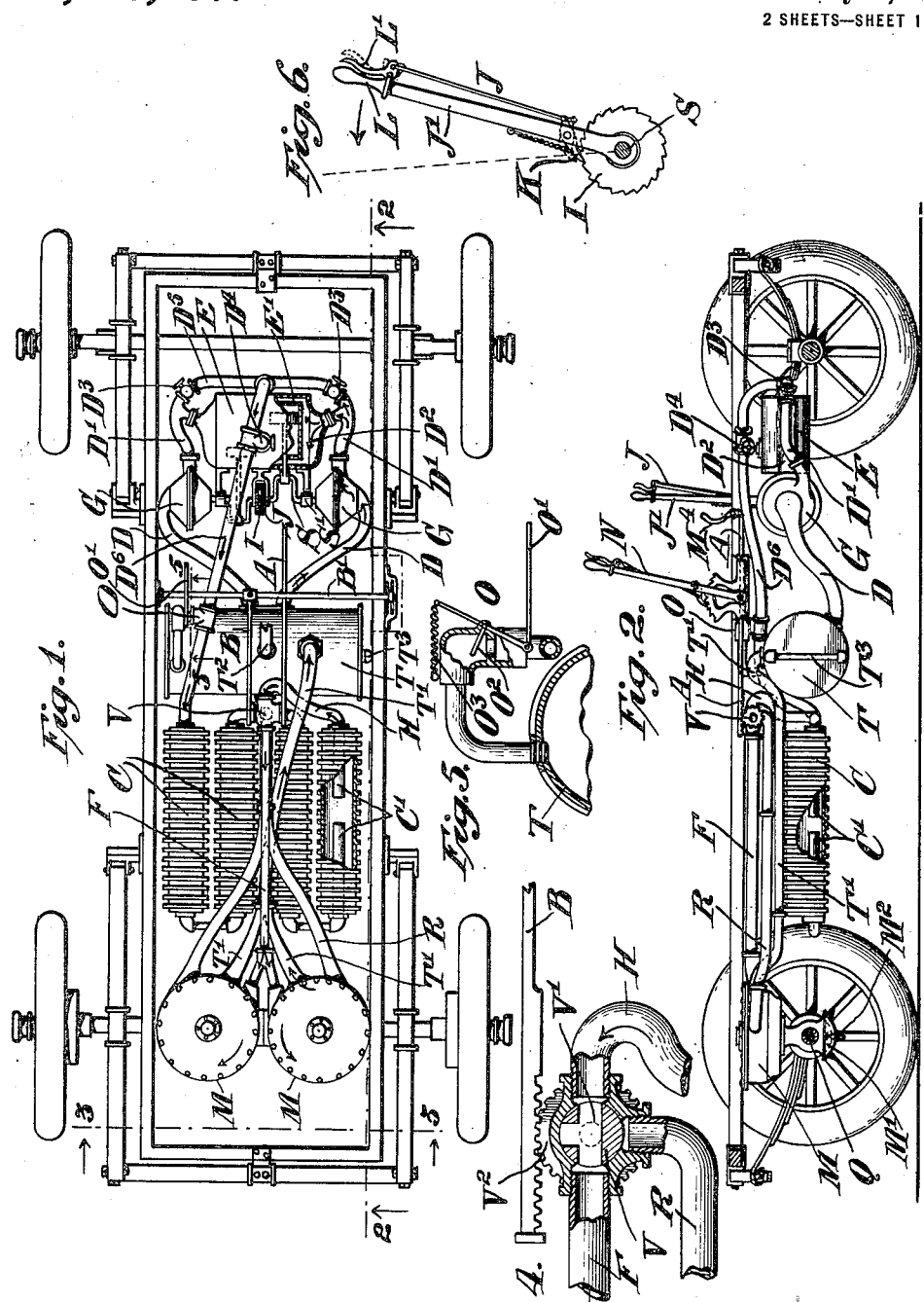

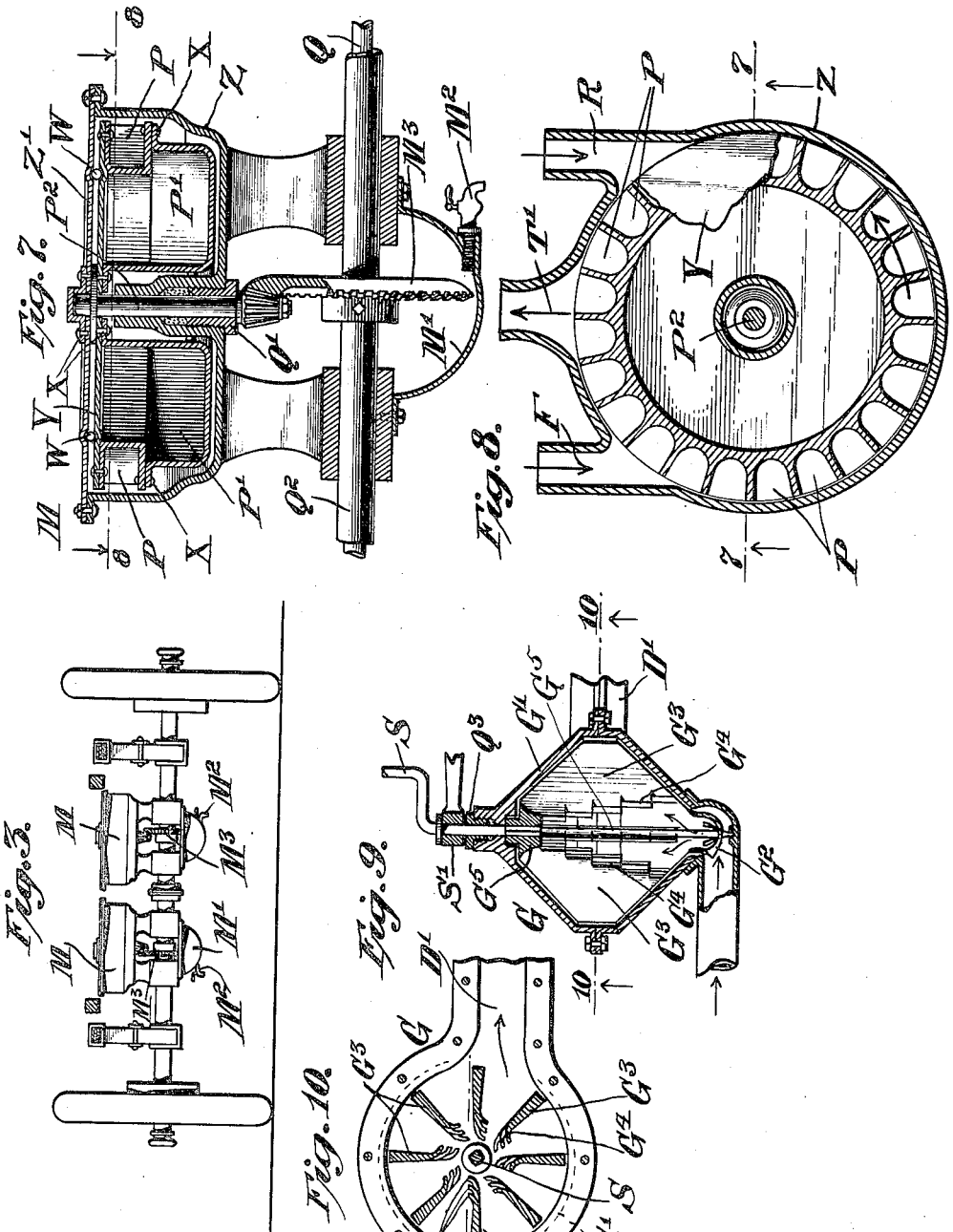

JOSEPH MOSES WARD KITCHEN, OF EAST ORANGE, NEW JERSEY.

HYDRAULIC POWER TRANSMISSION.

1,138,667.  Specification of Letters Patent.  Patented May 11, 1915.

Application filed February 21, 1907. Serial No. 358,561.

*To all whom it may concern:*

Be it known that I, JOSEPH MOSES WARD KITCHEN, a citizen of the United States, residing at East Orange, county of Essex, and State of New Jersey, have invented certain new and useful Improvements in Hydraulic Power Transmission, of which the following is a specification.

The object of my invention is to render motor driven vehicles actuated by explosive power more safe, tractable and dependable in use; which object I attain by utilizing means for the transmission of the power of an explosion engine, that is devoid of a rigid means of power transmission with the damaging frictional, jarring, and racking effects that are usually experienced in vehicles of this class. I preferably use hydraulic transmission of the power generated for conveying the power to the driving mechanism of the vehicle; but also may use electrical transmission under certain conditions.

The invention in particular consists in the use of various novel features in transmitting the power in such vehicles, and in the arrangement of the parts of the power transmitting mechanism to secure a stable equilibrium of the vehicle by keeping the center of gravity of the vehicle at a low level and by a desirable distribution of weight: and also to secure simplicity and safety in the driving management of such vehicles, so as to gain a wider practical application for them in general use. I do not broadly claim the idea of using either hydraulic or electrical transmission in such vehicles, as such use is old in the arts; but my claims are for such construction and disposition of the parts as will render such methods of power transmission in vehicles more practical and satisfactory.

In most cases a vehicle that would comprise my invention would be one or other type of automobile actuated by the power of exploding gases generated from liquid hydrocarbons; but I do not confine myself to evolving power from liquid fuel.

In the accompanying drawings which show desirable forms of the invention: Figure 1 represents a plan view of the chassis of an automobile to which my invention is applied, some of the parts being broken away. Fig. 2 is an elevation, partly in section, on the line 2—2, Fig. 1. Fig. 3 is a rear elevation, partly in section, on the line 3—3, Fig. 1. Fig. 4 represents a controlling valve, partly in section. Fig. 5 represents an enlarged view of a safety valve and correlated parts, partly in section, on the line 5—5, Fig. 1. Fig. 6 represents an engine starter. Fig. 7 represents on a larger scale in section, and partly in elevation, one of the two motor turbines taken on the line 7—7, Fig. 8. Fig. 8 represents a sectional plan view of one of the turbines on the line 8—8, Fig. 7. Fig. 9 represents on a large scale, a sectional horizontal view of a rotary pump. Fig. 10 represents in vertical section, the impelling means of the pump shown in Fig. 9.

The reference characters appended to the drawings represent as follows:

A is a rod actuating the controlling valve V. For clearness it is broken away. It connects with the foot lever $M^4$ (see Fig. 2) which can be used in emergencies to cut off the flow of motive fluid passing through the controlling valve.

B is the starting and reversing rod connecting the valve V with the hand lever N, and an intermediate rocker-shaft $B^1$.

C represents compression and cooling tanks for radiating heat from the motive fluid.

$C^1$ are entrance and exit pipes for the motive fluid which prevent the entire exit of compressed air or other gas from the tanks C.

D is a feed conduit for motive fluid leading from the tank T to the inlet of the centrifugal pump G.

$D^1$ is the outlet conduit from the centrifugal pump G.

$D^2$ is an inlet to the cooling jacket of one of the engine cylinders.

$D^3$ is a by-pass valve which regulates the amount of motive fluid passed over the cylinders of the engines through the cooling jacket $E^1$.

$D^4$ is an outlet valve for the cooling jackets of the cylinders which acts in conjunction with the by pass valve $D^3$.

$D^5$ is a by-pass conduit for excess pressure of motive fluid.

$D^6$ is a motive fluid conduit leading to the compression tanks C.

E represents an internal combustion engine.

$E^1$ is a cooling jacket.

F is an outflow conduit from the compression and cooling tanks C to the motor turbines M.

G is a combined centrifugal turbine pump and fly wheel.

$G^1$ is a casing for the centrifugal pump G. (See Fig. 9).

$G^2$ represents indrawing turbine blades of the impeller of the centrifugal pump. (See Fig. 9.)

$G^3$ are blades for imparting centrifugal motion to the motive fluid. These blades are thickened peripherally to secure weight and fly wheel momentum in the impeller. (See Fig. 9.)

$G^4$ are curved diverters for diverting a horizontal flow of the motive current to and for starting a centrifugal movement in the motive fluid. (See Figs. 9 and 10.)

$G^5$ is the shaft of the impeller (see Fig. 9.)

H is a motive fluid conduit leading from the compression tanks C to the motor controlling valve V.

I is the ratchet disk of the engine starter J.

J is the engine starter, the center of action of which is the same as that of the engine shaft S. (See Fig. 6.)

$J^1$ is the lever for starting the engine.

K is the engaging pawl of the starter J.

L is the handle of the starter J.

$L^1$ is the actuating handle for engaging the starting pawl with the ratchet disk I. (See Fig. 6.)

M is a motor turbine.

$M^1$ is a drip pan.

$M^2$ is a petcock for emptying the drip pan $M^1$. (See Fig. 3.)

$M^3$ is the bevel gearing for actuating the propelling axle Q. (See Fig. 7.)

$M^4$ is the foot lever for actuating the rod of the motive valve V. (See Fig. 2.)

N is a hand lever for actuating the motive controlling rod B. (See Fig. 2.)

O is an overflow safety valve for short circuiting the motive fluid into the tank T. (See Fig. 5.)

$O^1$ is a rod communicating with the fuel feeding provision of the engine.

$O^2$ is a valve lid.

$O^3$ is a valve closing spring.

P represents the buckets of the motor turbine M. (See Fig. 8.)

$P^1$ represents floatage cavities in the motor turbine's impeller. These cavities are fluid tight and contain air or other gas. (See Fig. 7.)

$P^2$ is the vertical shaft of the motor's impeller.

Q is a propulsion shaft.

$Q^1$ is a stuffing box. (See Fig. 7.)

$Q^2$ is a shaft housing.

$Q^3$ is a stuffing box for the casing $G^1$ and crank shaft S. (See Fig. 9.)

R is the reversing conduit for motive fluid.

S is the crank shaft for the engine.

$S^1$ is a bearing for the shaft S.

T is a storage tank for exhaust motive fluid.

$T^1$ is a motive fluid outlet from the motor turbines, which conveys the motive fluid to the storage tank T.

$T^2$ is a gas outlet and pipe leading to the engine's fuel feeding means, which means are not shown for clearness.

$T^3$ is a motive fluid gage.

V is the motor valve for starting or stopping the vehicle, for regulating the speed, and for reversing. (See Fig. 4.)

$V^1$ is a three way valve spindle.

$V^2$ is a valve actuating gear.

W represent anti-friction balls. (See Fig. 7.)

X are bolts used in the motor turbine.

Y is the power transmitting plate of the revolving turbine motor M. (See Figs. 7 and 8.)

Z is the motor turbine casing. (See Fig. 7.)

$Z^1$ is the top plate of the motor turbine casing.

The engine E may be of any usual type. I prefer to have the cylinders arranged horizontally in order to help bring the center of gravity of the automobile low down; and also so as to be able to construct a vehicle body over it. The valves, carbureters, commutators, batteries, spark generators, etc., which are present in such engines, are here not shown to promote clearness in the drawings. The engine shown is of a two cylinder, four cycle type, and is so arranged as to alternately exert explosive pressure on the cranks of the engine shaft S, which is horizontally disposed in a direction transverse to the longitudinal axis of the chassis. The engine starter J has its ratchet disk I connected with the shaft S. Its handle L can be conveniently reached from the front seat of the vehicle, and by giving the starting lever $J^1$ a quick pull, and engaging the pawl K by means of the handle $L^1$ with the ratchet on the disk I, the shaft S can be revolved and the engine started.

At the ends of the shaft S are fixed rotary pumps G for the generation of motive power in a fluid power transmitting medium. The fluid used may be water; or, a mixture of water, alcohol and glycerin may be used; but I prefer to use a hydro-carbon oil of a specific gravity which prevents much volatilization of the oil by the heat of the engine. In the centrifugal pump G, the principle is adopted of introducing the motive fluid into the center of the impeller of the pump with the indrawing blade $G^2$ in the internal cavity of the impeller; which cavity is large at the end at which the fluid enters, and converges to a small diameter at the opposite end. The form of the impeller here shown is for the purpose of preventing retardation of the fluid passing through the pump owing to a lesser rate of travel for the fluid at the center of the pump. The curved current diverters G⁴ start the flow of the motive fluid centrifugally and progressively increasing motion is given to the fluid by the impeller blades G³. These blades are thickened at their peripheral extremities in order to increase the momentum of the impeller and thus cause the impeller to act as a fly wheel, in carrying the cranks on the shaft S past dead centers. The revolving impeller of the pump has bearings at both ends of the fixed pump-casing G¹. The ends of the shaft S are square, and axially fit into a square hole at the hub end G⁵ of the impeller of the pump.

As the impeller acquires speed, the motive fluid is forced peripherally through the outlet conduit D¹. Some of the fluid is passed through the inlet D² through the cooling jacket E¹, and the balance is forced through the by-pass conduit D⁵. The amount of fluid passing through the water cooling jacket E¹ is regulated by the valves D³ and D⁴. The motive fluid then travels through the conduit D⁶ to the compression and cooling tanks C. If the pressure becomes too great, some of the fluid overflows through the safety valve O into the storage tank T. This valve O has a rod O¹ connecting with the fuel feeding means of the engine E; the connection not being shown in the drawings. The lid of the valve O² is held to its seat by the spring O³.

The motive fluid in passing through the cooling jackets of the engine cylinders, absorbs the heat of explosion; and provision is made for cooling the fluid in its passage through the compression tanks C. The tanks may have ordinary means for increasing the radiation of heat from their surfaces. The motive fluid enters at one end of one of the tanks and travels thence through the tanks successively from end to end, being progressively cooled in its travel through the several tanks. In each compression tank are the inlet and outlet pipes C¹, which are there so placed as to prevent the compressed gas in the tank from being forced out during the varying alterations in the level in the tanks in passing over varying grades of the roadbed traversed by the automobile; the compressed gas in the tank relatively maintaining a level; and hence some gas is always present at one or the other end of the tank. The air or other gas in the tanks C acts as an elastic cushion allowing for the accumulation of force in the tanks, neutralizing the shock of explosion, and providing for an equable outflow of the motive fluid under pressure.

The motive fluid is forced out through the conduit H to the controlling valve V. This valve has a three way spindle V¹, and the valve spindle actuating means V², which rotates the spindle V¹. As the spindle rotates to a greater or less degree, the motive fluid is allowed to pass through the valve in varying quantities; or is entirely prevented from passing therethrough; thus furnishing the means for starting the automobile and for securing any degree of speed in the vehicle, for stopping it, or for reversing it. When a forward motion is desired in the vehicle, the flow of motive fluid is directed through the conduit F; if a reverse motion is desired, the fluid is directed through the conduit R. The operation of this valve can be readily understood by referring to Fig. 4. After passing the controlling valve V, the fluid is forced to and through the motor turbines M. These turbines revolve in a horizontal plane; this arrangement being made in order to secure a greater leverage power for the force supplied to the impellers of the motors, than would be practical in vertically arranged motors of a lesser diameter in low hung automobiles. This motor turbine M is constructed so as to have its impeller float and revolve in a bath of the motive fluid with which the motor casing Z becomes filled in use, (see Fig. 7.) The impeller of this motor turbine is affixed to a vertically disposed shaft P², which has its centers in a bearing in the cavity of the casing plate Z¹ and in the center of the stuffing box Q¹. The impeller is floated by means of the air cavities P¹ which are bolted to the horizontal plate Y, and to the impeller buckets P by means of the bolts X. Friction of the impeller against the plate Z¹ from tilting, is prevented by the interposition of ball bearings W between the plates Y and Z¹. By floating the impeller of this motor, friction is decreased, and wear and tear prevented by relieving the beveled gear M³ from the weight of the motor's impeller. This gear M³ is preferably the only one in the apparatus; as in this system of transmission, there is no need for any clutch, speed gear, or differential gear on the divided axle. An individual turbine on each half of the divided axle obviates the need of a differential gear. The motive fluid is forced into the buckets P from the conduits F and R, giving motion to the turbine impeller, and finds its exit through the conduit T¹ to the storage tank T. This tank has a gage T³ for indicating the amount of motive fluid present in the tank T. This tank has a gas outlet T² connecting with the fuel feeding device of the engine; so that if a hydro-carbon oil is used as a motive fluid, any gas that may be formed in the passage of the oil through the cooling jackets of the cylinders, can be utilized for explosion purposes.

The several fluid conveying pipes in the mechanism herewith shown are in a measure elastically flexible so as to allow for expansion and contraction between parts and to obviate the shaking and jarring effects of the mechanism as it is propelled.

The mechanism here shown is intended to produce its effect by passing therethrough a large volume of motive fluid at a relatively low pressure, in a circulatory round.

The advantages of the form of invention shown in the drawings, are: low initial cost of construction, durability as to wear and tear, and facility in management.

What I claim as new, and desire to secure by Letters Patent, is:

1. In a motor driven vehicle, the combination with the chassis and drive wheels of the vehicle, of (1) means for generating motive power by explosion, (2) means for transferring the power of said explosion to a flowing fluid, (3) means for storing or accumulating the power thus transferred, the said last named means comprising provision for equalizing and diffusing the intense interrupted shock and jar of explosion into a continuous smooth outflow of a power transmitting medium, and (4) means for revolving a shaft by the power thus transmitted, said mechanism being constructed and disposed to drive said motor vehicle and having the following described specific construction and arrangement of parts; said parts being horizontally disposed in relation to and at a level below the upper border of the chassis frame of said vehicle, said first named means having at the front of said frame one or more pistoned engines horizontally acting in the line of the greatest length of said frame, a crank shaft transversely disposed to the greatest length of said frame and so disposed as to receive rotary motion from the reciprocal motion of the pistons of said engine, one or more rotary pumps attached to said shaft and rotating with said shaft, said engine and pumps being placed interior to the side lines of said frame, said third named means comprising one or a connected series of air and fluid compression tanks or pipes constructed and arranged to pass serially therethrough a motive fluid and for holding a compressed gas for equalizing the outgoing pressure of said fluid, said fourth named means comprising a fluid actuated motor revolving in a horizontal plane.

2. In a motor driven vehicle, the combination of the chassis and drive wheels of the vehicle with, a mechanism for transmitting power comprising (1) means including a pump for producing through explosion rotary motion in a crank shaft, (2) a horizontally disposed shaft for driving said vehicle, (3) a horizontally rotating motor, (4) means for communicating the rotary motion of the horizontally rotating motor to said horizontally disposed driving shaft, and (5) means for relieving friction due to the weight of said fourth named means in communicating motion to said driving shaft through the buoyant force of a liquid.

3. In a motor driven vehicle, the combination with the chassis and drive wheels of the vehicle of (1) an internal combustion engine, (2) a pump for forcing a fluid, (3) means for the compression and accumulation of said fluid, (4) a horizontally rotating motor floating in a fluid, (5) the driving shaft of said vehicle, (6) means for communicating motion from said motor to said driving shaft, and (7) means for conveying fluid in a circulatory round between and through said pump, compression tank and horizontally rotating motor.

4. In a motor driven vehicle, the combination of the chassis and drive wheels of the vehicle with a mechanism for transmitting power comprising (1) an explosion engine, (2) means actuated by said engine for pumping a fluid power transmitting medium and for conveying said medium to power accumulating cooling and pressure equalizing tanks, (3) said tanks, (4) a valve for transmitting power and for controlling the amount of power transmitted to the propulsion shaft of said vehicle and for reversing motion in said propulsion shaft and for stopping motion in said shaft, (5) means for controlling the actuating mechanism of said valve through the use of the hand and of the foot, (6) means for securing a differential rate of rotation in the propulsion wheels of said vehicle, (7) a horizontally rotating floating turbine motor actuated by said fluid medium through the power generated by said engine, said motor having an impeller floating in a liquid in a casing impervious to fluids in its lowest levels, said casing being a part of said motor, and (8) a gearing connecting said impeller and the propulsory shaft of said vehicle.

5. In a motor driven vehicle, the combination with the chassis, traction wheel, guiding wheel, and driving shaft for said traction wheel of the vehicle, of the following parts supported by said chassis, (1) an internal combustion engine and means for forcing a power transmitting fluid with the energy generated in said engine, (2) combined storage, compression and cooling tanks for said fluid, (3) a motor actuated by said forced fluid for driving said shaft, (4) a cooling jacket for the cylinder of said engine, (5) means for forcing said fluid through said cooling jacket to and into said tanks and from said tanks to and through said motor for actuating said shaft, (6) means for controlling the amount of cooling fluid passing through said jacket, (7) an overflow safety valve located between said fifth named means and said compression and cooling tanks, (8) two conduits at a low level in each of said tanks, said conduits entering said tanks at the ends of said tanks from without said tanks, and opening in said tanks near the center and at about an equal distance from the ends of said tanks, (9) a receiving tank for motive fluid exhausted from said motor, (10) means for conveying said fluid from said motor to said receiving tank, (11) means for conveying said fluid from said tenth named means to said forcing means, and (12) means for conveying gas for combustion from said last named tank to said engine.

6. In a motor driven vehicle, the combination with the drive shaft and wheels of the vehicle, of a chassis frame, an engine, an accumulator of force, and a propulsory motor, said engine having a crank shaft transversely disposed to said chassis frame, said crank shaft having attached thereto at both of its ends means for generating a flow of motive fluid, said means also acting to secure through acquired momentum continuous rotary motion in said crank shaft, said parts being located below the upper level of said chassis frame and so distributed as to secure a low center of gravity and a transversely distributed equilibrium of the weight and balance of said parts in relation to the chassis frame of said vehicle.

7. In a motor driven vehicle, the combination with the chassis, traction wheel, guiding wheel, and driving shaft for said traction wheel of said vehicle, of the following parts supported by said chassis, an engine and parts connecting said engine and said drive shaft, said parts comprising a crank shaft and two rotary hydraulic pumps, said pumps being attached to said crank shaft by square ends on said crank shaft and fitting into square sockets formed in said rotary pumps.

8. In a motor driven vehicle, the combination with a propulsory shaft for the vehicle of, a horizontally rotating motor comprising a vertically disposed shaft or axle, said motor having means for gearing the shaft or axle of said motor to the propulsory shaft of said vehicle and further means for the relief of friction in said gearing by the upward pressure of the impeller of said motor floating in a fluid, said motor comprising means for preventing friction of the impeller of said motor against the bottom of the casing of said motor through floating said impeller and for preventing friction against the top of said motor by the interposition of ball bearings, said construction providing against the jar and shock conveyed t osaid motor through the unevenness of the road traversed by said vehicle.

9. In a motor vehicle, the combination with the drive shaft and drive wheels of said vehicle, of two horizontally revolving motors oppositely rotating to secure balance in said vehicle, means for gearing said motors with said drive shaft, means for supplying motive liquid to said motors, said motor being hydraulically driven.

10. In a motor driven vehicle, the combination with the chassis and the drive wheels of the vehicle, of the internal combustion engine E, the crank shaft S, the combined pump and fly-wheel G, the overflow safety valve O, the compression and cooling tanks C, the motor turbines M, the motor valve V, the exhaust storage tank T, the cooling jacket $E^1$, the connecting pipes, the actuating rods of the vehicle, the entrance and exit pipes $C^1$, the valves $D^3$ and $D^4$, the conduits, the beveled gearing $M^3$, the floating elements $P^1$, and the levers N and $M^4$, said elements being coöperatively arranged constructed and disposed in relation to the chassis of said motor driven vehicle substantially as herein shown and described, and for the purpose set forth.

Signed at New York, N. Y., this 20th day of February 1907.

JOSEPH MOSES WARD KITCHEN.

Witnesses:
Geo. L. Wheelock,
Olive B. King.